(12) United States Patent
Oyler et al.

(10) Patent No.: US 8,513,153 B2
(45) Date of Patent: Aug. 20, 2013

(54) FUEL ADDITIVE

(75) Inventors: S. Deborah Oyler, Roanoke, VA (US); Edward Carroll Hale, III, Roanoke, VA (US)

(73) Assignee: UTO Environmental Products Limited, Halifax (GB)

( * ) Notice: Subject to any disclaimer, the term of this patent is extended or adjusted under 35 U.S.C. 154(b) by 658 days.

(21) Appl. No.: 12/638,251

(22) Filed: Dec. 15, 2009

(65) Prior Publication Data

US 2010/0269403 A1 Oct. 28, 2010

Related U.S. Application Data

(60) Provisional application No. 61/171,540, filed on Apr. 22, 2009.

(51) Int. Cl.
*B01J 27/00* (2006.01)
*C10L 1/12* (2006.01)

(52) U.S. Cl.
USPC ............. 502/208; 502/209; 502/353; 44/354; 44/361

(58) Field of Classification Search
USPC ............................. 44/354; 502/208, 209, 353
See application file for complete search history.

(56) References Cited

U.S. PATENT DOCUMENTS

| | | | |
|---|---|---|---|
| 3,974,255 A * | 8/1976 | Erickson et al. ............ 423/212 |
| 4,039,650 A | 8/1977 | Daley | |
| 4,221,768 A * | 9/1980 | Inoue et al. ............... 423/239.1 |
| 4,908,045 A * | 3/1990 | Farrar ............................ 44/361 |
| 4,955,331 A * | 9/1990 | Hohr et al. ................... 123/1 A |
| 4,978,514 A | 12/1990 | Hofmann et al. | |
| 5,139,754 A | 8/1992 | Luftglass et al. | |
| 5,143,707 A | 9/1992 | Beck et al. | |
| 5,298,230 A | 3/1994 | Argabright et al. | |
| 5,307,772 A * | 5/1994 | Rao et al. ..................... 123/272 |
| 5,552,129 A | 9/1996 | Farnos et al. | |
| 5,589,147 A | 12/1996 | Farnos et al. | |
| 5,591,418 A | 1/1997 | Bhattacharyya et al. | |
| 5,612,010 A | 3/1997 | Pandey et al. | |
| 5,643,542 A | 7/1997 | Leyrer et al. | |
| 5,809,775 A | 9/1998 | Tarabulski et al. | |
| 5,924,280 A | 7/1999 | Tarabulski | |
| 6,207,120 B1 | 3/2001 | Belmonte et al. | |
| 6,248,684 B1 | 6/2001 | Yavuz et al. | |
| 6,274,107 B1 | 8/2001 | Yavuz et al. | |

(Continued)

FOREIGN PATENT DOCUMENTS

| EP | 0341832 | 11/1989 |
| EP | 1188913 A1 * | 3/2002 |
| WO | WO99/66009 * | 12/1999 |

OTHER PUBLICATIONS

Supplementary European Search Report in related EP 09843790 Case, Oct. 10, 2012, pp. 1-79.

*Primary Examiner* — Ellen McAvoy
*Assistant Examiner* — Ming Cheung Po
(74) *Attorney, Agent, or Firm* — Woodard, Emhardt, Moriarty, McNett & Henry LLP

(57) ABSTRACT

Described are catalyst compositions and methods for their preparation and use. Certain catalyst compositions can include at least one reduction catalyst and at least one oxidation catalyst. A catalyst composition as described herein is useful in providing certain benefits to a combustible fuel, such as, for example, reducing harmful emissions and/or improving overall fuel economy.

40 Claims, 6 Drawing Sheets

(56) References Cited

U.S. PATENT DOCUMENTS

| | | |
|---|---|---|
| 6,677,264 B1 | 1/2004 | Klein et al. |
| 7,198,764 B2 | 4/2007 | Fisher et al. |
| 7,235,507 B2 | 6/2007 | Xu et al. |
| 7,291,259 B2 | 11/2007 | Gupta et al. |
| 7,313,911 B2 | 1/2008 | Pfeifer et al. |
| 7,334,397 B2 | 2/2008 | Blomquist |
| 7,485,270 B2 | 2/2009 | Twigg et al. |
| 7,615,200 B2 | 11/2009 | Lin et al. |
| 2001/0038812 A1 | 11/2001 | Yavuz et al. |
| 2003/0124037 A1 | 7/2003 | Voss et al. |
| 2005/0201916 A1 | 9/2005 | Yavuz et al. |
| 2006/0035780 A1 | 2/2006 | Xu et al. |
| 2007/0081934 A1 | 4/2007 | Hubig et al. |
| 2007/0089403 A1 | 4/2007 | Pfeifer et al. |
| 2008/0085231 A1 | 4/2008 | Vitse et al. |
| 2008/0112870 A1 | 5/2008 | Moini et al. |
| 2009/0155151 A1 | 6/2009 | Liu et al. |
| 2009/0263304 A1 | 10/2009 | Yoshida et al. |
| 2010/0055014 A1 | 3/2010 | Lin et al. |
| 2010/0058746 A1 | 3/2010 | Pfeifer et al. |
| 2010/0077737 A1 | 4/2010 | Girard et al. |

\* cited by examiner

FUEL ADDITIVE

REFERENCE TO RELATED APPLICATION

This application claims the benefit of U.S. Provisional Application No. 61/171,540, filed Apr. 22, 2009.

BACKGROUND

Combustion occurs by the initiation, propagation, and termination of oxygen free radical reactions. In combustion engines, boilers, etc., the free radical reactions between atmospheric oxygen and carbon-based fuels are typically initiated thermally. The reactions result in oxidation of carbon, forming carbon dioxide ($CO_2$) and carbon monoxide (CO), when the predominant species is based on the ratio of carbon to oxygen present in the fuel/air mixture. Maximum efficiency in terms of energy output is favored when carbon dioxide is the end result, and this reaction is favored at high temperatures when there is sufficient oxygen present to complete the reaction.

Other elements are typically present in the fuel and in the air, and on reaction with oxygen free radicals during combustion, oxides of nitrogen ($NO_X$), oxides of sulfur ($SO_X$), water, etc., are formed. In cases when the amount of oxygen is insufficient to cause complete oxidation, unburned fuel can cause emission of particulate materials, soot, unburned hydrocarbons, etc. Particulates/soot, unburned hydrocarbons, CO, $NO_X$, and $SO_X$ are considered unwanted byproducts of fuel combustion, and steps are taken post-combustion to reduce their presence in exhaust gases resulting from the combustion process. $CO_2$ is a byproduct of combustion that is known to be environmentally damaging as well.

Noble metals of the Group VIII elements are known to be particularly efficacious for the purpose of forming oxygen free radicals to promote combustion. Other Group VIII metals such as iron, cobalt, and nickel are intermediate in terms of their ability to promote formation of oxygen free radicals but are suitable for the purpose of enhancing combustion efficiency. While combustion enhancement via catalysis is useful from an efficiency standpoint, from an emissions standpoint, improvements in combustion efficiency also cause a rise in unwanted $NO_X$ and $SO_X$ levels in exhaust gases. An improvement on the one hand has a concomitant adverse effect on the other.

In view of the above, a need remains for improved additives for combustible fuels that can reduce harmful emissions, improve combustion efficiency in exhaust gases, increase engine torque, increase engine horsepower, and generally improve fuel economy.

SUMMARY

In one embodiment, a composition is provided. The composition includes a combustible fuel, a reduction catalyst mixture including a first reduction catalyst and a second reduction catalyst, and an oxidation catalyst suitable for increasing oxygen free radical formation during combustion. The oxidation catalyst is chosen such that it does not interfere with the reduction reactions caused by the reduction catalyst mixture in order to make the reduction catalyst mixture effective to reduce harmful emissions during combustion of the combustible fuel.

In another embodiment, a catalyst composition is provided. The catalyst composition includes a reduction catalyst mixture including a first reduction catalyst and a second reduction catalyst, and an oxidation catalyst suitable for increasing oxygen free radical formation during combustion. The oxidation catalyst does not interfere with the reduction reactions caused by said catalyst mixture such that the catalyst mixture is effective to reduce harmful emissions during combustion of a combustible fuel.

In yet another embodiment, a method for preparing a composition for use as a fuel additive is provided. The method includes providing a reduction catalyst mixture including a first reduction catalyst and a second reduction catalyst. The catalysts are blended in a carbon-based liquid fuel stock. The reduction catalyst mixture is effective to reduce harmful emissions of the fuel during combustion.

In another embodiment, a method for improving fuel economy while reducing harmful emissions is provided. The method includes providing a combustible fuel and a composition comprising a first reduction catalyst, a second reduction catalyst, and an oxidation catalyst. The catalyst composition is mixed with the combustible fuel. The catalyst composition is effective to improve fuel economy while reducing harmful emissions during combustion of said fuel.

DETAILED DESCRIPTION

Figure 1:
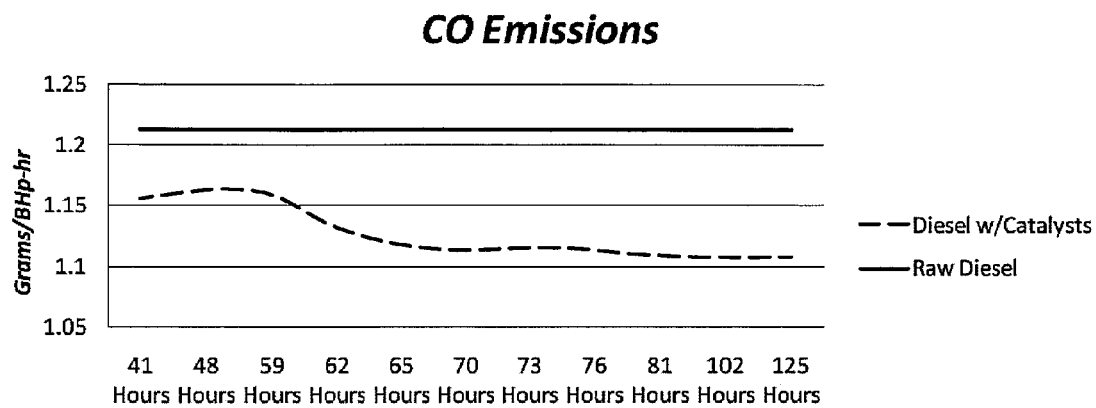
FIG. 1 graphically depicts carbon monoxide emissions over time for diesel fuel with and without a catalyst composition as described herein.
Figure 2:
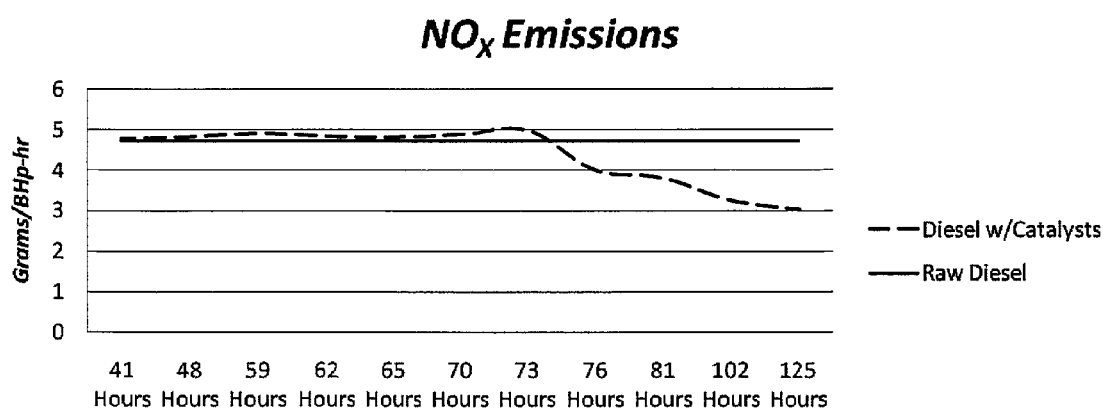
FIG. 2 graphically depicts $NO_X$ emissions over time for diesel fuel with and without a catalyst composition as described herein.
Figure 3:
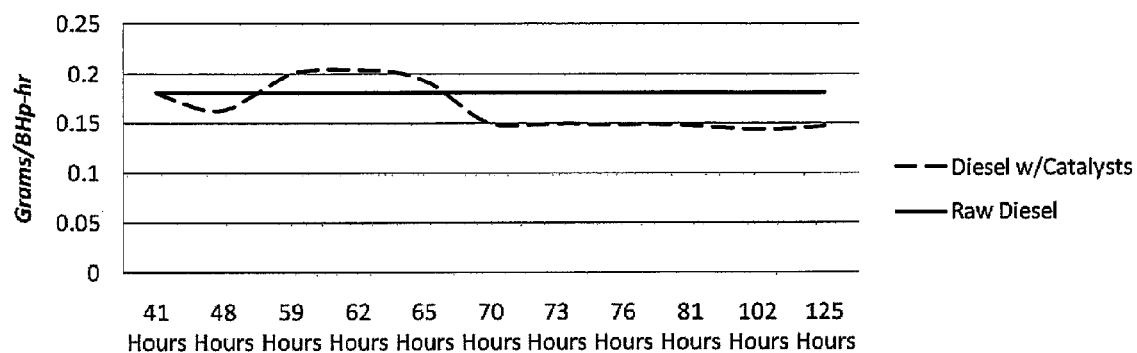
FIG. 3 graphically depicts unburned hydrocarbon emissions over time for diesel fuel with and without a catalyst composition as described herein.
Figure 4:
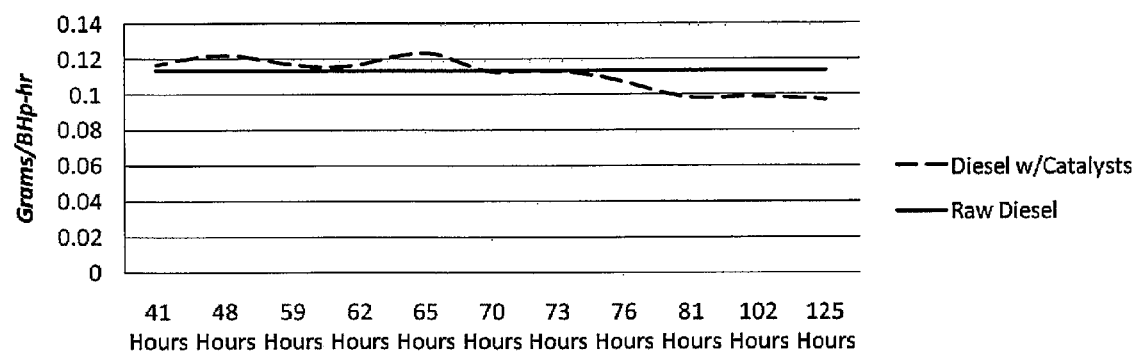
FIG. 4 graphically depicts particulate emissions over time for diesel fuel with and without a catalyst composition as described herein.

As described above, provided is a composition including a blend of catalysts that can impart certain benefits to standard combustible fuel types, including both solid and liquid carbon-based fuels. For example, such a composition can facilitate combustion of a combustible fuel. Such a composition can also facilitate reduction reactions post-combustion to reduce emissions of harmful substances, such as $NO_X$, $SO_X$, $CO_2$, etc. In this respect, one or more catalyst(s) contained in this composition would desirably enhance combustion while its intermediate activity in terms of promoting free radical reactions is such that it may not counteract the effect of other catalysts present in the fuel that act to promote free radical reduction reactions post-combustion.

In one embodiment, a composition as described herein can include at least one oxidation catalyst suitable for increasing oxygen free radical formation to enhance combustion efficiency and at least one reduction catalyst suitable for carrying out a reduction reaction. The first reduction catalyst and the second reduction catalyst can act as reducing agents, thereby reducing $NO_X$, $SO_X$, CO, and $CO_2$ levels jointly or severally in combustion exhaust gases. In a preferred embodiment, there are at least two reduction catalysts added to the blend, each of which causes reduction of specific species in the exhaust gas.

Any number of catalysts can be included in a composition to achieve the desired results. For example, a composition can include a blend of at least two, at least three, at least four, at least five, or even at least six or more catalysts. In one preferred embodiment, a composition can include a first reduction catalyst and a second reduction catalyst. In another preferred embodiment, a composition can include a first reduction catalyst, a second reduction catalyst, and an oxidation catalyst. It will be understood that any number of reduction and oxidation catalyst(s) can be used to carry out the desired effect and can be chosen through routine experimentation by a skilled artisan.

Transition metals, in specific molecular forms, are effective at forming free radicals that facilitate reduction reactions. Therefore, it was thought that a catalyst suitable for reducing $NO_X$ to $N_2$ and another catalyst suitable for reducing $SO_X$ to elemental S could potentially offset the effect of a combustion-improving catalyst on those species. In this respect, a first reduction catalyst as described herein is typically included to facilitate reduction of $NO_X$ and/or $SO_X$. Such a catalyst(s) can be based on Group V metals, such as vanadium. In one preferred embodiment, a first reduction catalyst and a second reduction catalyst can be included in a catalyst composition to effectively reduce both $NO_X$ and $SO_X$. In such an embodiment, two vanadium-based catalysts, one comprising a chemical compound consisting of mixed vanadium oxides and phosphorus oxides and another comprising a chemical compound consisting of vanadium and antimony oxides are preferably used. Although vanadium is a preferred metal on which to base the reduction catalyst(s), other metals such as niobium, tantalum, copper, and antimony can also be used, and can, in certain embodiments, be blended with copper, silver, gold, zinc, or other elements found in Groups IIIb, IVb, Vb, and VIa of the Periodic Table.

In certain embodiments, an oxidation catalyst can also be included in the composition, for instance, to increase oxygen free radical formation and improve combustion efficiency. Such a catalyst can be based on a Group VIII metal. In one embodiment, an organometallic compound, preferably containing iron within its molecular structure, is present in the composition as an oxidation catalyst. One particularly preferred oxidation catalyst is the commercially available organometallic compound Ferrocene, $Fe(C_5H_5)_2$. Desirably, an oxidation catalyst can be included in the composition to facilitate improved combustion without adversely affecting reduction reaction catalysts. Although iron was selected as the transitional metal catalyst most likely to be able to achieve a balance between oxygen free radical formation and not acting to hinder the effect of reduction catalyst effects on CO, $CO_2$, $NO_X$, and $SO_X$, platinum, osmium, iridium, ruthenium, rhodium, palladium, nickel, and cobalt can be used as a component of an oxidation catalyst.

The amount of each catalyst present in solution can vary widely depending on the application. As well, the amount of each catalyst will depend on whether or not the catalyst is being provided in a dry or liquid state. For liquid catalysts, the amount of catalyst will depend on the type and amount of solvent used to dissolve the catalysts. A specific mixture that has been tested extensively in diesel fuel applications was prepared as follows: 100 mL of butyl cellosolve, 0.05 grams each of a first reduction catalyst and a second reduction catalyst, and 0.9 grams of an oxidation catalyst were placed in a flask and mixed together, creating a solution of the three catalysts.

In one embodiment, a liquid composition is provided that includes a first reduction catalyst, a second reduction catalyst and an oxidation catalyst. To prepare such a composition, each catalyst can be mixed with a liquid carrier. For example, a mixture of catalysts in a liquid carrier is to blend varying amounts of Ferrocene, antimony butoxide, and vanadium oxytriethoxide in a solvent suitable for addition to liquid fuels or dispersal on solid fuels. A preferred solvent for use in preparing compositions as described herein includes commercially available butyl cellosolve. Heat has been used to hasten the dissolution of the catalysts in butyl cellosolve, although it is not specifically required. Ferrocene was found to be highly soluble in butyl cellosolve and required no special steps to assure dissolution. In one preferred embodiment, the catalyst mixture is dissolved in an organic solvent or a blend of solvents. The dissolved mixture is then blended with any type of carbon-based liquid fuel stocks.

The solvent carrier is selected for its ability to hold each of the catalysts in solution and to freely mix with liquid fuels such as diesel or gasoline. The solvent carrier is also selected to act as an effective dispersant when added to solid fuels. However, when being blended with liquid fuels of varying types, the solvent carrier may contain other solvents or materials advantageously chosen to improve octane rating, depress cloud point, and obtain other beneficial characteristics. An example of a class of suitable solvents would be glycol ethers in general, with ethylene glycol monobutyl ether (butyl cellosolve, also referred to as 2-Butoxy-1-ethanol, CAS No. 111-76-2) being a specific example of a glycol ether in which the catalysts are miscible, which glycol ether solutions are further miscible in various carbon-based liquid fuels.

As indicated above, any suitable fuel can be used in conjunction with a present catalyst composition described herein. For example, the fuel can be any carbon-based solid or liquid fuel. Liquid fuels can include, for example, diesel, gasoline, heating oil, jet fuel, bunker fuel, ethanol, and biodiesel. Solid fuels that can be used include, for example, coal, biomass, crumb rubber, and wood.

For liquid fuels, the mixture produced as described above can be blended at a rate of 1 fluid ounce per 30 gallons (US) of fuel, although lower or higher blend ratios can used. For solid fuels, the addition rate of each catalyst has been determined to be variable, depending on the type of fuel used and the objective to be addressed by the fuel amendment. In this respect, the blend rate for a particular catalyst with a particular fuel can be determined through routine experimentation by a skilled artisan.

With respect to solid fuels, a catalyst composition can be applied to such a fuel type in any suitable manner. For example, a catalyst composition as described herein can be dry-blended with a carbon-based solid fuel. Alternatively, the dissolved catalysts can be sprayed onto the surface of the solid fuels. In another embodiment, the catalyst blend is suspended in a viscous material such as pitch, which acts as a carrier to aid in application of the catalyst blend to the surface of solid fuels such as coal. The viscous material may be emulsified, heated, or otherwise treated to enhance its ability to be applied to the surface of solid fuels.

The dry or dissolved catalysts may also be metered into the combustion chamber while liquid or solid fuels are being burned. In practical terms, the catalysts simply need to be present in the combustion area to be effective, regardless of the means of introduction.

In addition to reducing harmful emissions and improving fuel economy, the present catalyst compositions can also be useful to increase the BTU output of a combustible fuel, such as a fuel to power boilers or to power other processes. As well, when used in fuel powering a reciprocating engine, the presence of a catalyst composition as described herein can increase engine torque and horsepower.

EXAMPLES

In order to promote a further understanding of the present invention and its features and advantages, the following specific Examples are provided. However, it will be understood that these Examples are illustrative only and are in no way limiting.

Example 1

This example demonstrates the feasibility of preparing a blend of catalysts to add to a combustible fuel to achieve desired benefits.

In order to determine whether it was possible to catalytically reduce $NO_X$ and $SO_X$ to $N_2$ and elemental S in exhaust gases, and potentially to reduce $CO_2$ emissions, consider the following potential reduction reaction pathways when CH and $CH_2$ act as hydrocarbon free radicals:

$$2NO_2 + CH_2 = N_2 + CO_2 + H_2O + 0.5O_2 \qquad 1.)$$

$$0.5O_2 + SO_2 + CH_2 = S + CO_2 + H_2O \qquad 2.)$$

$$2CO_2 + 4CH = 6C + O_2 + 2H_2O \qquad 3.)$$

$$O_2 + CO_2 + 2CH = 3CO + H_2O \qquad 4.)$$

Free energy data for the free radicals are not available in literature but were estimated to determine free energy calculations at 842 degrees Fahrenheit. It was assumed that the free radicals could be generated during combustion by the following reaction sets:

$$C_3H_8 + air = CH2(NO_X) + CH_2(SO_2) + CH_4 \qquad 5.)$$

$$C_3H_6 + air = CH(CO) + CH(CO_2) + CH_4 \qquad 6.)$$

The results of the free energy calculations for the reduction reactions outlined above are tabulated below:

| Reaction | 1 | 2 | 3 | 4 |
|---|---|---|---|---|
| Free Energy, kcal/mol | −48.9 | −18.7 | 25.8 | −28.8 |
| Heat of Formation of Free Radical in kcal/mol | −124 | −68 | 35.8 | −6.7 |
| Heat of Formation of Compound in kcal/mol | −90.5 | −56.8 | 54.2 | −6.7 |

The negative free energies for reactions 1, 2, and 4 indicate that they are favored under high-temperature conditions. The free energy for reaction 3, even though positive, is sufficiently low to be thermodynamically favored. While the results do not prove the reaction mechanism is correct, it does demonstrate that the reactions are feasible and represent a viable mechanism for the reactions to occur. Since the thermodynamics of the required reactions are feasible, appropriate catalysts to achieve the end result were selected and used to create a catalyst blend.

Example 2

This Example demonstrates a method for preparing a first reduction catalyst for use in the compositions described herein.

Vanadium pentoxide was provided and was converted to a peroxy form by mixing vanadium pentoxide into a solution of hydrogen peroxide and allowing the peroxy conversion to occur. When the conversion was complete, as evidenced by formation of a dark red, opaque solution, antimony trioxide was added in a molar ratio of 1:1 (vanadium:antimony), and the mixture heated for several hours, which formed a dark grey to black precipitate. The precipitate was collected and was dried overnight at 105° C. The dried precipitate was calcined at 650° C. for 8 hours, ground to a powder, and then the powdered precipitate was calcined at 810° C. for an additional 3 hours, to obtain the catalyst $V_4Sb_6O_8$.

Example 3

This Example demonstrates a method for preparing a second reduction catalyst for use in the compositions described herein.

Vanadium pentoxide was placed in a flask with a solution of hydrochloric acid and boiled for several hours to reduce the oxidative state of vanadium from +5 to +2. Phosphoric acid was introduced to the solution of hydrochloric acid and reduced vanadium, in a molar ratio of 1.1:1 (phosphorus: vanadium). The solution was boiled for several hours, allowing the water initially comprising the hydrochloric acid solution to evaporate slowly, forming a thick precipitate. The precipitate was filtered and then washed by boiling for a short period of time in deionized water. The washed precipitate was filtered, then dried overnight at 105 degrees C. and calcined at 550 degrees C. for 6 hours to obtain the catalyst $(VO)_2P_2O_7$.

Example 4

This Example demonstrates a method for preparing a blend of a first reduction catalyst and a second reduction catalyst and the addition of this catalyst to a liquid fuel.

The liquid catalyst blend was prepared by addition of 0.05 grams each of the first reduction catalyst detailed in Example 1 and the second reduction catalyst detailed in Example 2. 0.9 grams of Ferrocene to 100 mL of butyl cellosolve was also added to this catalyst blend. This mixture was heated slightly to aid in dissolving the catalysts. The liquid catalyst blend was added to both diesel fuel and regular gasoline at rates ranging from 1 fluid ounce of catalyst blend to 30 gallons of fuel to 1.1 fluid ounces of catalyst blend to 25 gallons of fuel.

A gasoline-powered 1999 Ford Ranger 4-cylinder pickup truck was subjected to the United States Environmental Protection Agency (USEPA) CVS 78 Chassis Dynamometer Test Protocol. The test consisted of cold-start measurements of emissions over a 505-second period, a transient phase lasting 864 seconds, and a hot-start phase lasting 505 seconds. These periods correspond to city/interurban driving, highway driving, and a final, hot-start phase. The total distance traveled was 11.04 miles, the total duration of the test was 1874 seconds, and the average speed was 21.2 mph. The fuel used was commercially available 91 octane Chevron gasoline. The test was initially performed using raw gasoline. The test was performed a second time using gasoline amended with the liquid catalyst blend at the rate of 1.1 fluid ounces per 25 gallons of gasoline.

CO and $NO_X$ content in the exhaust gases were monitored and the emissions were reported using units of grams emitted per mile traveled. Table 1 contains the results of the trial.

TABLE 1

Summary of Results, Weighted Emissions in Grams Emitted per Mile Traveled

|  | CO | $NO_x$ |
|---|---|---|
| City/Interurban Cycle | | |
| Baseline | 0.673 | 0.111 |
| With Additive | 0.895 | 0.065 |
| % Difference | +32.9 | −41.5 |
| Highway Cycle | | |
| Baseline | 0.139 | 0.045 |
| With Additive | 0.070 | 0.029 |
| % Difference | −49.7 | −35.5 |
| Hot 505 Cycle | | |
| Baseline | 0.060 | 0.241 |
| With Additive | 0.036 | 0.077 |
| % Difference | −40.0 | −68.8 |

Emissions from a Cummins M-11 diesel engine were also tested. In preliminary testing, it was found that the engine required a significant conditioning period when catalyst-amended fuel was being used to power the engine before significant emission reductions were noted. It is believed that this is due to the need for the reduction catalysts to reach sufficient and consistent levels resident in the exhaust system to achieve significant levels of reduction reactions.

Baseline testing of emissions from raw diesel using a hot-start 505-second protocol was performed in triplicate, and the average emission rates for CO, unburned hydrocarbons, $NO_X$, and particulate matter were determined. $SO_X$ emissions were not determined due to the use of ultra-low sulfur diesel fuel.

Then, the fuel was switched to diesel blended with the liquid catalyst blend at a rate of 1 fluid ounce per 30 gallons of fuel. The engine was operated for a break-in period of 41 hours before hot-start 505-second protocol was initiated to determine emissions. Emissions were determined at 41 hours, 48 hours, 59 hours, 62 hours, 65 hours, 70 hours, 73 hours, 76 hours, 81 hours, 102 hours, and 126 hours of operation. FIGS. 1-4 indicate the change in emissions over time.

As shown in FIGS. 1-4, the emissions for each respective graph were significantly reduced over time when a catalyst blend as described herein was added to the fuel. Conversely, these same emissions remained virtually unchanged over time when diesel fuel was used alone. Accordingly, a composition including a catalyst blend as described herein can be useful in reducing harmful emissions from fuel over time.

Example 5

This Example demonstrates that both engine torque and combustion efficiency can be improved when a composition including a catalyst blend as described herein is added to a liquid fuel.

The baseline period using raw diesel and test period using diesel containing liquid catalyst blend were 5 hours long on a current Euro-spec Ford 2.2 liter diesel engine. Engine loading rates were varied between 25% and 100% in 25% increments, and engine RPM was varied between 1500 RPM and 3300 RPM. Torque, $CO_2$, $NO_X$, and unburned hydrocarbons were monitored during each phase of the study.

It was noted that engine torque increased significantly when fuel containing the liquid catalyst blend at 1 fluid ounce per 30 gallons of diesel was being combusted. The increase in torque and reduction in unburned hydrocarbons was essentially instantaneous whereas the expected reducing effect on $CO_2$ and $NO_X$ in the exhaust was either not seen or was marginal. It was posited that 5 hours was an insufficient time for conditioning to achieve sufficient levels of catalysts resident in the exhaust system to reduce $NO_X$ and $CO_2$.

Figure 5:
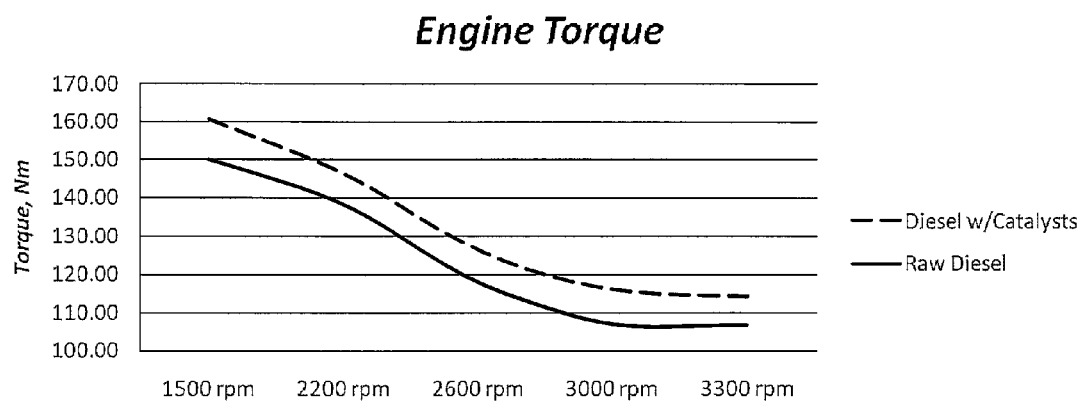
FIG. 5 graphically depicts engine torque compared to RPM for diesel fuel with and without a catalyst composition as described herein.
Figure 6:
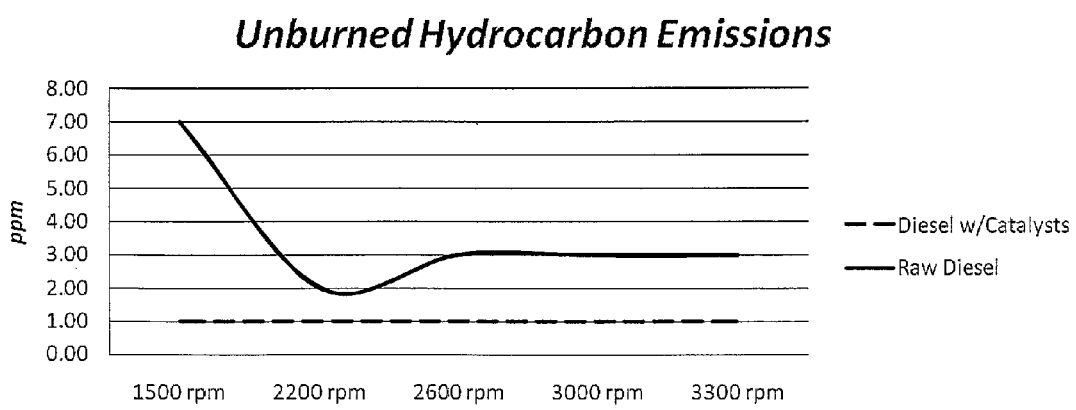
FIG. 6 graphically depicts unburned hydrocarbon emissions compared to RPM for diesel fuel with and without a catalyst composition as described herein.
Figure 7:
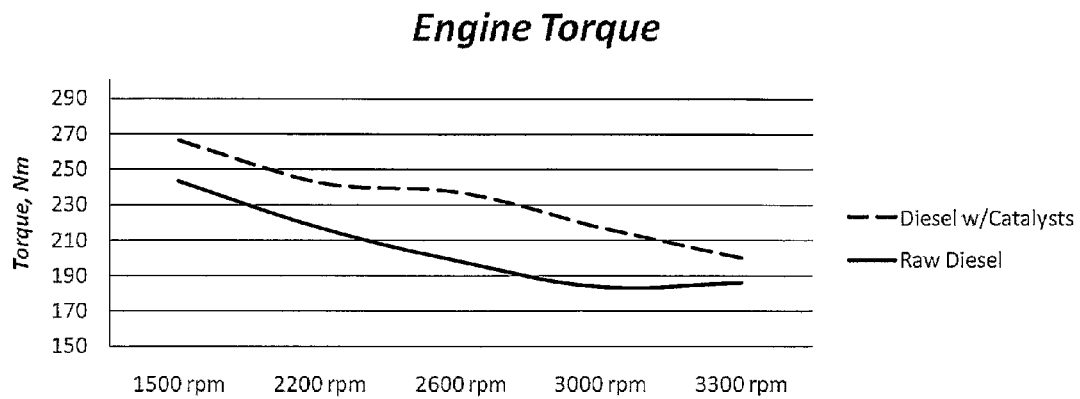
FIG. 7 graphically depicts engine torque compared to RPM for diesel fuel with and without a catalyst composition as described herein.
Figure 8:
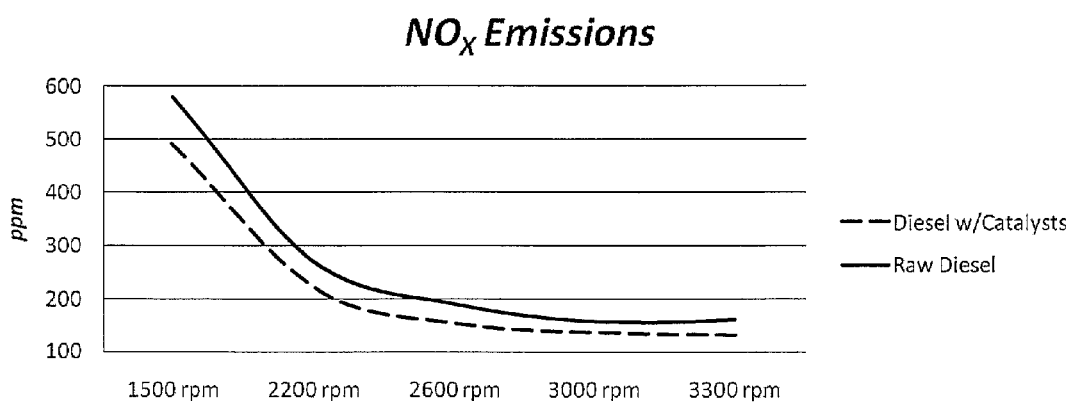
FIG. 8 graphically depicts $NO_X$ emissions compared to RPM for diesel fuel with and without a catalyst composition as described herein.
Figure 9:
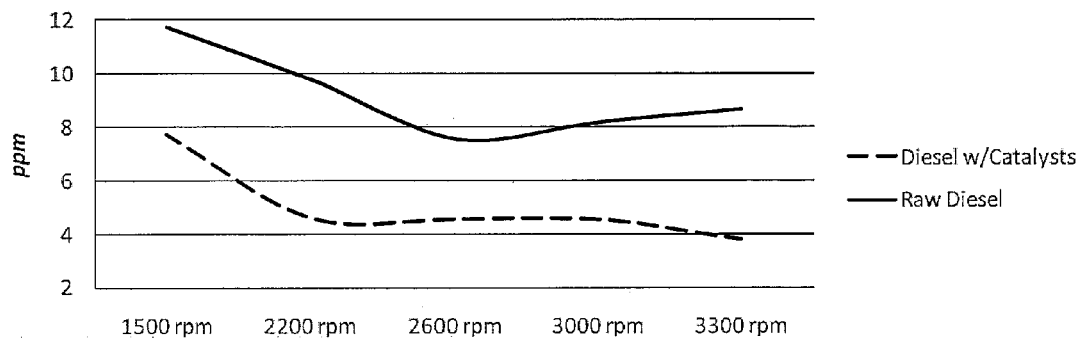
FIG. 9 graphically depicts unburned hydrocarbon emissions compared to RPM for diesel fuel with and without a catalyst composition as described herein.
Figure 10:
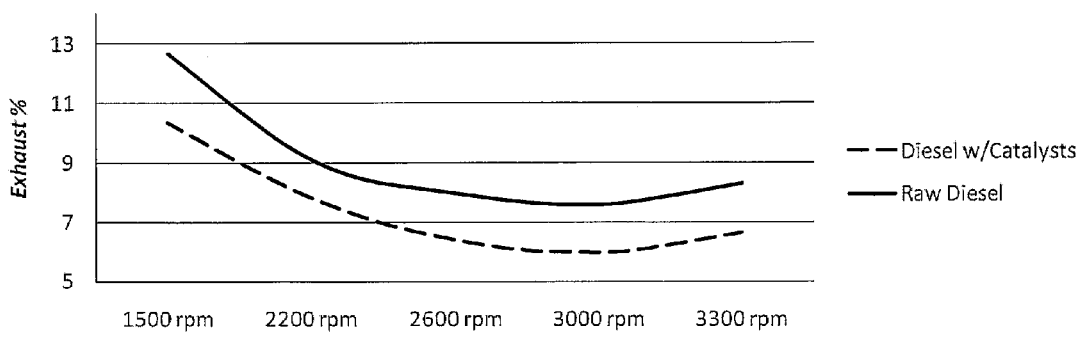
FIG. 10 graphically depicts $CO_2$ emissions compared to RPM for diesel fuel with and without a catalyst composition as described herein.
Figure 11:
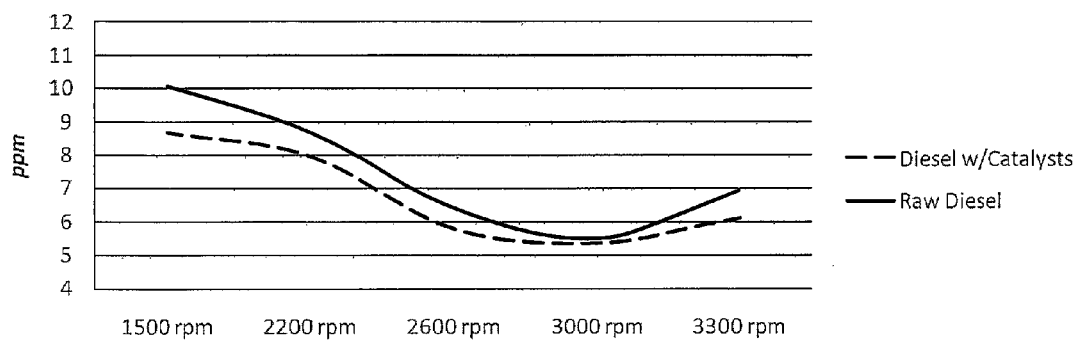
FIG. 11 graphically depicts CO emissions compared to RPM for diesel fuel with and without a catalyst composition as described herein.

FIG. 5 indicates comparative torque levels at varying engine RPMs and 50% loading rate, which is the loading rate most indicative of typical use. FIG. 6 indicates comparative hydrocarbon levels in exhaust gas at a 50% loading rate. All data were collected at the end of their respective 5-hour runs.

In a second trial, this time using a Euro-spec Ford 2.2 liter diesel engine that meets upcoming European Union emissions regulations, the baseline and test phases of the trial were extended from 5 hours to 57 hours to insure that the exhaust system had time to be properly conditioned.

The diesel engine used in this trial has a state-of-the art engine controller system that uses sensor readings of exhaust gas composition to continuously adjust the air-fuel ratio as combustion conditions change. It was thought that the controller system may have a confounding effect on torque and possibly emissions due to the potential for restructuring the air-fuel ratio on the fly based on exhaust $O_2$ levels, and it was expected that the exhaust $O_2$ levels would be different in the amended diesel when compared to the raw diesel. This, however, proved not to be the case.

Figure 12:
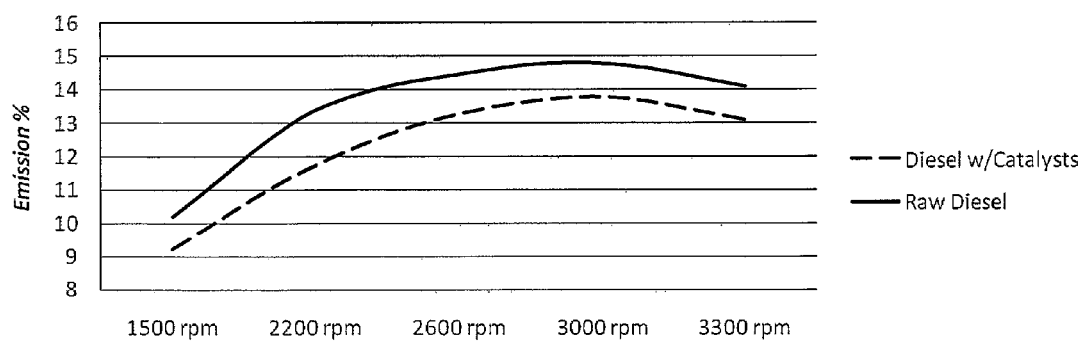
FIG. 12 graphically depicts $O_2$ emissions compared to RPM for diesel fuel with and without a catalyst composition as described herein.

FIGS. 7 through 11 show the relative differences in torque, $NO_X$ emissions, $CO_2$ emissions, unburned hydrocarbon emissions, and CO emissions between raw diesel and diesel with liquid catalyst blend in it at varying engine RPMs and 50% loading rate, which is the loading rate most indicative of typical use. FIG. 12 indicates the percentage of $O_2$ in the exhaust gas under the same circumstances. As seen in FIG. 12, the exhaust $O_2$ levels are lower in the diesel with catalysts present, which, coupled with the unburned hydrocarbon emissions data, indicates improved combustion efficiency.

The catalyst combination appears to have a positive effect on engine torque and combustion efficiency, and, after proper engine conditioning, reduces unwanted emissions such as $NO_X$, CO, $CO_2$, particulates/soot, and unburned hydrocarbons.

Since torque is a measure of tractive effort, and the catalyst has been shown to improve both torque and combustion efficiency, it was expected that improved fuel economy would result from use of the catalyst blend in fuel.

Example 6

This Example demonstrates that a composition including a catalyst blend as described herein can be added to a fuel to improve fuel economy.

A commercial diesel truck was operated for several months using commercially available diesel, and the average fuel economy was determined. The liquid catalyst blend was prepared as in the other Examples and was added to diesel fuel at a rate of 1 fluid ounce per 30 gallons of diesel. The truck was operated for a period of 5 weeks using the diesel fuel with catalyst blend added, and, at the end of that period, the average fuel economy was calculated. Table 2 indicates the results of the trial.

TABLE 2

Comparison of MPG Figures in a
Commercial Diesel-Powered Truck

|  | Total MPG |
|---|---|
| Raw diesel average fuel economy | 5.37 |
| Diesel with catalyst blend average fuel economy | 6.19 |
| % Difference | +15.27 |

As shown in the Table above, the fuel economy of diesel fuel can be improved with the addition of a catalyst blend to the fuel.

Example 7

This Example further demonstrates that a composition including a catalyst blend as described herein can be added to a fuel to improve fuel economy.

A second fuel economy test was undertaken, this time using six school buses running predetermined routes. The six buses were separated into pairs to match the type of bus, engine type and accumulated mileage, and route traveled. For a period of 2 months, each pair was run on raw diesel, fuel economy between each fill-up was calculated, and the average fuel economy for each bus was determined. The per-tank fuel economy for each bus in a given pair was compared to determine whether there was a statistically significant difference between them. In every case, there was no significant difference. At the end of the baseline period, one bus from each pair was fueled with raw diesel, while the other bus was fueled with diesel containing 1 fluid ounce of liquid catalyst blend per 30 gallons of diesel. The buses were operated as normal for another 2 months, the per-tank fuel economy determined, and the 2-month average fuel economy for each bus was calculated. The per-tank fuel economy data set for each bus in any given pair was compared to determine whether there was a statistically significant difference between the data sets. In every pair, there was a statistically significant increase in fuel economy for each bus using diesel with the catalyst blend compared to the bus using raw diesel. The average fuel economy for the control and test bus in each pair is presented in Table 3, along with the percentage difference between the two.

TABLE 3

Comparison of MPG figures in Paired
Diesel-Powered School Buses

|  | Raw Diesel | Diesel w/Catalysts | Percent Difference |
|---|---|---|---|
| Pair 1 | 5.45 | 5.85 | +7.25% |
| Pair 2 | 5.78 | 6.99 | +20.96% |
| Pair 3 | 6.05 | 7.18 | +18.77% |
| Average Difference |  |  | +15.66% |

As shown in the Table above, the fuel economy of diesel fuel can be improved with the addition of a catalyst blend to the fuel.

Example 8

This Example was performed to test coal combustion emissions using the same catalyst blend described above.

Lump stoker coal was treated with the liquid catalyst blend at the rate of 1 pint of liquid catalyst blend added to 1 ton of coal. The coal was subsequently burned in a boiler, and the exhaust gases were monitored for the presence of $NO_X$ and $SO_X$. BTU values, CO, $CO_2$, and particulates/soot were not monitored. Exhaust gases from the treated coal exhibited 50-55% less $SO_X$, and 25-45% less $NO_X$ than exhaust gases from untreated stoker coal from the same batch. The variability noted in this trial was related, in large part, to the batch feeding operation, which resulted in periods when combustion in the boiler was not optimized with regard to air-fuel ratios.

Example 9

This Example was performed to test the BTU output of a fuel type treated with a catalyst blend as described above.

Paulownia wood chips were treated at the rate of 1 pint liquid catalyst blend per ton of wood chips. The treated wood chips exhibited a BTU output increase of 8.51% compared to untreated wood chips. When the test was repeated to insure that the increase was not an anomaly, the treated wood chips again exhibited a BTU output increase compared to untreated wood chips. The increase noted was 8.42%. Accordingly, a composition including a catalyst blend as described herein can be used to increase the BTU output of a solid fuel type.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating that any non-claimed element is essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A composition comprising:
  a combustible fuel; and
  a catalyst mixture; wherein said catalyst mixture comprises:
    a reduction catalyst mixture including a first reduction catalyst and a second reduction catalyst, wherein said first reduction catalyst comprises mixed vanadium oxides and phosphorus oxides, and wherein said second reduction catalyst comprises vanadium and antimony oxides; and
an oxidation catalyst comprising ferrocene;
wherein said mixed vanadium and antimony oxides comprises $V_4Sb_6O_8$.

2. A composition comprising:
a combustible fuel; and
a catalyst mixture; wherein said catalyst mixture comprises:
a reduction catalyst mixture including a first reduction catalyst and a second reduction catalyst, wherein said first reduction catalyst comprises mixed vanadium oxides and phosphorus oxides, and wherein said second reduction catalyst comprises vanadium and antimony oxides; and
an oxidation catalyst comprising ferrocene;
wherein said mixed vanadium oxides and phosphorus oxides comprises $(VO)_2P_2O_7$.

3. A catalyst composition, comprising:
a reduction catalyst mixture including a first reduction catalyst and a second reduction catalyst, wherein said first reduction catalyst comprises mixed vanadium oxides and phosphorus oxides, and wherein said second reduction catalyst comprises vanadium and antimony oxides; and
an oxidation catalyst comprising ferrocene;
wherein said mixed vanadium and antimony oxides comprises $V_4Sb_6O_8$.

4. A catalyst composition, comprising:
a reduction catalyst mixture including a first reduction catalyst and a second reduction catalyst, wherein said first reduction catalyst comprises mixed vanadium oxides and phosphorus oxides, and wherein said second reduction catalyst comprises vanadium and antimony oxides; and
an oxidation catalyst comprising ferrocene;
wherein said mixed vanadium oxides and phosphorus oxides comprises $(VO)_2P_2O_7$.

5. A method, comprising:
providing a combustible fuel;
providing a catalyst mixture composition comprising a first reduction catalyst, a second reduction catalyst, and an oxidation catalyst, wherein said first reduction catalyst comprises mixed vanadium oxides and phosphorus oxides, and wherein said second reduction catalyst comprises vanadium and antimony oxides; and wherein said oxidation catalyst comprises ferrocene; and
mixing said catalyst mixture composition with said combustible fuel to provide a fuel/catalyst mixture;
wherein said mixed vanadium and antimony oxides comprises $V_4Sb_6O_8$.

6. A method, comprising:
providing a combustible fuel;
providing a catalyst mixture composition comprising a first reduction catalyst, a second reduction catalyst, and an oxidation catalyst, wherein said first reduction catalyst comprises a chemical compound consisting of mixed vanadium oxides and phosphorus oxides, and wherein said second reduction catalyst comprises a chemical compound consisting of vanadium and antimony oxides; and wherein said oxidation catalyst comprises ferrocene; and
mixing said catalyst mixture composition with said combustible fuel to provide a fuel/catalyst mixture;
wherein said mixed vanadium oxides and phosphorus oxides comprises $(VO)_2P_2O_7$.

7. A composition according to claim 1 wherein said mixed vanadium oxides and phosphorus oxides comprises $(VO)_2P_2O_7$.

8. A composition according to claim 2 wherein said mixed vanadium and antimony oxides comprises $V_4Sb_6O_8$.

9. A composition according to claim 3 wherein said mixed vanadium oxides and phosphorus oxides comprises $(VO)_2P_2O_7$.

10. A composition according to claim 4 wherein said mixed vanadium and antimony oxides comprises $V_4Sb_6O_8$.

11. A method according to claim 5 wherein said mixed vanadium oxides and phosphorus oxides comprises $(VO)_2P_2O_7$.

12. A method according to claim 6 wherein said mixed vanadium and antimony oxides comprises $V_4Sb_6O_8$.

13. A composition comprising a combustible fuel and a catalyst mixture;
wherein said catalyst mixture comprises a reduction catalyst mixture and an oxidation catalyst;
wherein said reduction catalyst mixture includes a first reduction catalyst and a second reduction catalyst,
wherein said first reduction catalyst comprises $(VO)_2P_2O_7$, and wherein said second reduction catalyst comprises $V_4Sb_6O_8$; and
wherein said oxidation catalyst comprises ferrocene.

14. The composition of claim 13 wherein said catalyst mixture composition includes a solvent.

15. The composition of claim 14 wherein said solvent is a glycol ether.

16. The composition of claim 15 wherein said glycol ether is ethylene glycol monobutyl ether.

17. The composition of claim 14 wherein said catalyst mixture composition comprises 0.05 g of said first reduction catalyst and 0.05 g of said second reduction catalyst for every 100 ml of said solvent.

18. The composition of claim 14 wherein said catalyst mixture composition comprises about 0.5 g to 0.9 g of said oxidation catalyst for every 100 ml of said solvent.

19. The composition of claim 13 wherein said combustible fuel is a liquid combustible fuel.

20. The composition of claim 19 wherein said liquid combustible fuel is a diesel fuel.

21. The composition of claim 19 wherein said liquid combustible fuel is a gasoline.

22. A catalyst composition effective for addition to a liquid fuel, said catalyst composition comprising a reduction catalyst mixture and an oxidation catalyst;
wherein said reduction catalyst mixture includes a first reduction catalyst and a second reduction catalyst,
wherein said first reduction catalyst comprises $(VO)_2P_2O_7$, and wherein said second reduction catalyst comprises $V_4Sb_6O_8$; and
wherein said oxidation catalyst comprises ferrocene.

23. The composition of claim 22 wherein said catalyst mixture composition includes a solvent.

24. The composition of claim 23 wherein said solvent is a glycol ether.

25. The composition of claim 24 wherein said glycol ether is butyl cellosolve (ethylene glycol monobutyl ether).

26. The composition of claim 23 wherein said catalyst mixture composition comprises 0.05 g of said first reduction catalyst and 0.05 g of said second reduction catalyst for every 100 ml of said solvent.

27. The composition of claim 23 wherein said catalyst mixture composition comprises about 0.5 g to 0.9 g of said oxidation catalyst for every 100 ml of said solvent.

28. A method, comprising:
providing a combustible fuel;
providing a catalyst mixture composition comprising a first reduction catalyst, a second reduction catalyst, and an oxidation catalyst,
wherein said first reduction catalyst comprises $(VO)_2P_2O_7$, wherein said second reduction catalyst comprises $V_4Sb_6O_8$, and wherein said oxidation catalyst comprises ferrocene; and
mixing said catalyst mixture composition with said combustible fuel to provide a fuel/catalyst mixture.

29. The method of claim 28, and further including the step of combusting said fuel/catalyst mixture in an internal combustion engine.

30. The method of claim 28 wherein said catalyst mixture composition includes a solvent.

31. The method of claim 30 wherein said solvent is a glycol ether.

32. The method of claim 31 wherein said glycol ether is butyl cello solve (ethylene glycol monobutyl ether).

33. The method of claim 28 wherein said combustible fuel is a liquid combustible fuel.

34. The method of claim 33 wherein said liquid combustible fuel is a diesel fuel.

35. The method of claim 33 wherein said liquid combustible fuel is a gasoline.

36. The method of claim 30 wherein said catalyst mixture composition comprises 0.05 g of said first reduction catalyst and 0.05 g of said second reduction catalyst for every 100 ml of said solvent.

37. The method of claim 30 wherein said catalyst mixture composition comprises about 0.5 g to 0.9 g of said oxidation catalyst for every 100 ml of said solvent.

38. The method of claim 30 wherein said catalyst mixture composition is added to said combustible fuel in an amount of about 1 fluid ounce of catalyst mixture composition per 30 gallons of combustible fuel.

39. The method of claim 30 wherein said catalyst mixture composition is added to said combustible fuel in an amount of about 1 fluid ounce of catalyst mixture composition per 30 gallons of combustible fuel.

40. The method of claim 30 wherein said catalyst mixture composition comprises 0.05 g of said first reduction catalyst and 0.05 g of said second reduction catalyst for every 100 ml of said solvent, wherein said catalyst mixture composition comprises about 0.5 g to 0.9 g of said oxidation catalyst for every 100 ml of said-solvent, and wherein said catalyst mixture composition is added to said combustible fuel in an amount of about 1 fluid ounce of catalyst mixture composition per 30 gallons of combustible fuel.

* * * * *